ent [19] [11] 3,725,412
Houlihan et al. [45] Apr. 3, 1973

[54] SUBSTITUTED α,α,γ-TRIPHENYL-AMINOPROPANOLS

[75] Inventors: William J. Houlihan, Mountain Lakes; Jeffrey Nadelson, Parsippany, both of N.J.

[73] Assignee: Sandoz-Wander, Inc., Hanover, N.J.

[22] Filed: Dec. 29, 1969

[21] Appl. No.: 888,873

[52] U.S. Cl........260/268 BZ, 260/239 B, 260/240 J, 260/243 B, 260/247.7 A, 260/247.7 K, 260/268 R, 260/268 BC, 260/293.62, 260/340.5, 260/326.8, 260/510.7, 260/591, 260/994, 424/250
[51] Int. Cl. .............................................C07d 51/70
[58] Field of Search................................260/268 BZ

[56] References Cited
UNITED STATES PATENTS 2,980,683  4/1961  Zauegg....................................260/28
3,452,095  6/1969  Adank..............................260/268 X
3,497,508  2/1970  Houlihan..........................260/268 X Primary Examiner—Donald G. Daus
Attorney—Gerald D. Sharkin, Frederick H. Weinfeldt, Robert S. Honor, Walter F. Jewell and Richard E. Vila

[57] ABSTRACT

Substituted α, α, γ-triphenyl-aminopropanols, e.g., 4-methyl-α, α, γ-triphenyl-1-piperazinepropanol, are prepared by treating substituted β-phenyl-β-aminopropiophenones with phenyl lithium or substituted phenyl lithium compounds. The compounds obtained are useful as diuretics and hypotensive/antihypertensive agents.

2 Claims, No Drawings

SUBSTITUTED α,α,γ-TRIPHENYL-AMINOPROPANOLS

This invention relates to α,α,γ-triphenyl-aminopropanols. More particularly, it relates to α,α,γ-phenyl and substituted phenyl-substituted aminopropanols, acid addition salts thereof, intermediates thereof and processes for their preparation.

The compounds of this invention may be presented by the following structural formula:

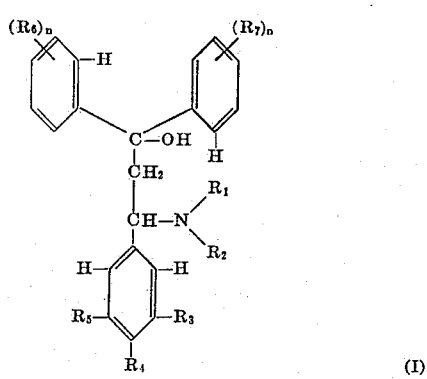

(I)

wherein $R_1$ and $R_2$ are independently, allyl, straight chain lower alkyl having 1 to 4 carbon atoms, e.g., methyl, ethyl, propyl or butyl, or $R_1$ and $R_2$ together are $-(CH_2)_m-$, where $m$ is 4, 5, 6 or 7, or $R_1$ and $R_2$ together are

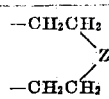

where Z is O, S, or N-$R_8$, where $R_8$ is lower alkyl having 1 to 4 carbon atoms, e.g., methyl, ethyl, propyl, isopropyl, butyl or isobutyl;

$R_3$, $R_5$, $R_6$ and $R_7$ are independently, hydrogen, halo having an atomic weight of 19 to 36, trifluoromethyl, lower alkyl having 1 to 4 carbon atoms, e.g., methyl, ethyl, propyl, isopropyl, butyl or isobutyl, or lower alkoxy having 1 to 4 carbon atoms, e.g., methoxy, ethoxy, propoxy, isopropoxy, butoxy or isobutoxy;

$R_4$ is hydrogen, halo having an atomic weight of 19 to 36, trifluoromethyl, or lower alkyl having 1 to 4 carbon atoms, e.g., methyl, ethyl, propyl, isopropyl, butyl, or isobutyl; or $R_3$ and $R_4$ together, or $R_4$ and $R_5$ together are methylenedioxy, and when $n = 2$, and/or $R_7$ may be methylenedioxy, and $n$ is 0, 1 or 2, provided that (1) no more than one of $R_6$ and/or $R_7$ may be trifluoromethyl; and (2) there are no adjacent trifluoromethyl groups.

The process for preparing the compounds of formula (I) may be represented by the following reaction scheme A:

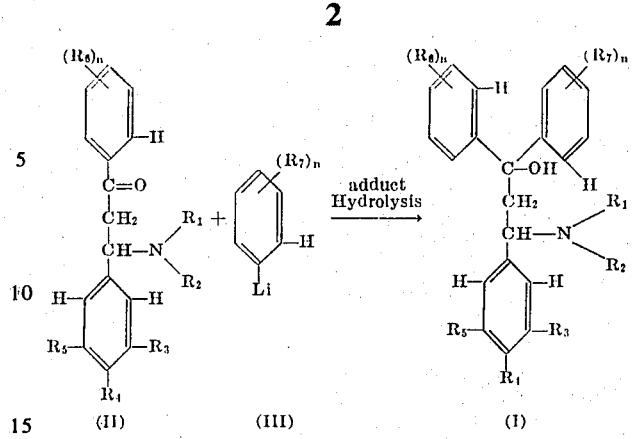

wherein $R_1$, $R_2$, $R_3$, $R_4$, $R_6$, $R_7$ and $n$ have the above stated significance.

The compounds of formula (I) are prepared by treating a compound of formula (II) with a compound of formula (III), in an inert solvent such as diethyl ether, tetrahydrofuran, hexane, heptane, benzene or the like, in the presence of an inert gas, e.g., nitrogen, helium or argon and subjecting the reaction mixture to hydrolysis, preferably with aqueous ammonium chloride. The reaction may be carried out at a temperature of from $-5°$ to $30°$ C., preferably from about $-5°$ to $15°$ C., for about 1.5 to 48 hours, preferably about 2 to 4 hours. Compound (III) is preferably added in inert solvent (as described above) to a cold ($-5°$ to $5°$ C.) inert solvent solution of compound (II). Neither the solvents nor the temperatures used are critical.

The compounds of formula (I) may be prepared in acid addition salt form, such as the hydrochloride, by conventional methods, such as suspending the compound in alcohol or water and treating with the appropriate acid. When it is desired to convert such salts to the corresponding free bases, conventional techniques may be utilized, e.g., dissolution of the salt in water and precipitation using a base such as sodium hydroxide.

The compounds of formula (I) may be recovered using conventional recovery techniques such as crystallization.

The compounds of formula (II) may be prepared by the following reaction scheme B:

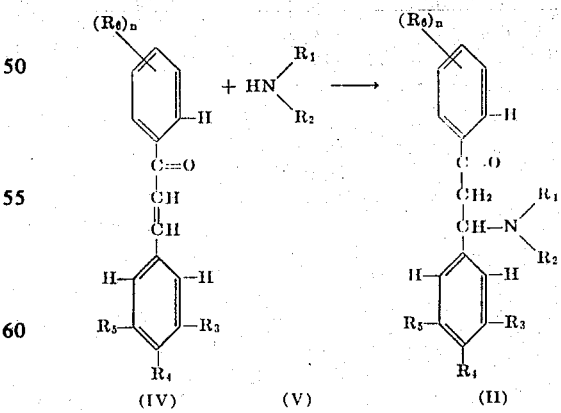

wherein $R_1$, $R_2$, $R_3$, $R_4$, $R_5$, $R_6$ and $n$ have the above stated significance.

The compounds of formula (II) are prepared by treating a compound of formula (IV) with an amine of formula (V) in an inert solvent and in the presence of an inert gas, indicated in scheme A. Although not critical, the reaction may be carried out at a temperature of from about 70° to 100° C., preferably about 80° to 85° C., for about 1 to 48 hours, preferably for about 1 to 18 hours.

Certain of the compounds of formulas (II), (III), (IV) and (V) are known known and may be prepared according to methods disclosed in the literature. These compounds of formulas (II), (III), (IV) and (V) not specifically disclosed are prepared according to analogous methods from known materials.

The compounds of formula (I), especially the compound of Example 1, are useful because they possess pharmacological activity in animals. More particularly, the compounds are useful as diuretics as indicated by their activity in the rat given 12.5 mg./kg. to 50 mg./kg. of animal body weight of active material. The test method used is basically as described by Roy Aston, Toxicol and Appl. Pharmacol., 1,277, 1959. For such usage, the compounds may be administered orally or parenterally.

The compounds of formula (I), especially the compound of Example 1, are also useful as hypotensive/antihypertensive agents as indicated by their activity in the anesthetized dog given 20 mg./kg. i.v. of active material, and tested by blood pressure measurement using a mercury manometer or transducer via a catheter inserted in a carotid or femoral artery.

The compounds of formula (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate, and the like and the organic acid salts, such as the succinate, benzoate, acetate, p-toluenesulfonate, benzenesulfonate, maleate, malate, tartrate, methanesulfonate, cyclohexylsulfamate and the like.

The compounds (I) may be combined with a pharmaceutically acceptable carrier or adjuvant. They may be administered orally or parenterally. The dosage will vary depending upon the mode of administration utilized and the particular compound employed.

The dosage administered for the diuretic use may vary depending on the particular compound employed, the therapy desired and the severity of the condition being treated. In general, satisfactory results are obtained when administered at a daily dosage of from about 2 milligrams to about 100 milligrams per kilogram of animal body weight, preferably given in divided doses, 2 to 4 times a day, or in sustained release form. For most large mammals (e.g., primates) the total daily dosage is from about 150 milligrams to about 1,500 milligrams of the compound and the dosage forms suitable for internal use comprise from about 37.5 milligrams to about 750 milligrams of active compound in intimate admixture with a solid or liquid pharmaceutically acceptable carrier or diluent.

The dosage administered for the hypotensive/antihypertensive use may vary depending on the particular compound employed, the therapy described and the severity of the condition being treated. In general, satisfactory results are obtained when the compounds are administered at a daily dosage of from about 4 to 200 milligrams per kilogram of animal body weight. This daily dosage is preferably given in divided dosage, e.g., 2 to 4 times a day, or in sustained release form. For most large animals (e.g., primates), the total daily dosage is from about 300 to 2000 milligrams. Dosage forms suitable for internal administration comprise from about 75 to 1,000 milligrams of the active compound in admixture with a solid or liquid pharmaceutical carrier or diluent.

A representative formulation suitable for oral administration is a capsule prepared by standard techniques which contain the following:

| Ingredients | Parts by Weight |
|---|---|
| 4-methyl-$\alpha,\alpha,\gamma$-triphenyl-1-piperazine propanol dihydrochloride | 50 |
| Inert filler (starch, kaolin, lactose, etc.) | 250 |

EXAMPLE I

4-Methyl- $\alpha,\alpha,\gamma$-triphenyl-1-piperazinepropanol dihydrochloride

Step 1 :$\beta$-phenyl-$\beta$-(4-methyl-1-piperazinyl)-propiophenone

To a flask equipped with a stirrer, thermometer, condenser and gas inlet tube maintained under a nitrogen atmosphere. There was added at room temperature 41.6 g (0.20 mole) of $\beta$-phenyl-acrylphenone followed by 20 g (0.20 mole) of N-methyl piperazine. After the initial exothermal reaction stopped (temperature rose to 50°C), the mixture was heated at 80°C with stirring for 2 hours, and then allowed to stand at room temperature for ca. 18 hours. The resulting solid was dissolved in 400 ml. of methylene chloride and extracted twice with 300 ml of brine and then twice with 250 ml 2N HCl. The aqueous acid was extracted once with 100 ml of methylene chloride, cooled and made basic (pH>10) by the addition of solid potassium hydroxide and extracted twice with 250 ml of methylene chloride. The methlene chloride was washed twice with 100 ml of brine, dried over anhydrous magnesium sulfate and evaporated in vacuo to yield the intermediate compound $\beta$-phenyl-B-(4-methyl-1-piperazinyl)-propiophenone.

Step 2: 4-methyl-$\alpha,\alpha,\gamma$-triphenyl-1-piperazinepropanol dihydrochloride To a flask equipped with a stirrer, dropping funnel, thermometer, condenser and gas inlet tube maintained under a nitrogen atmosphere. There was added at room temperature 58 ml of 2.2M phenyl lithium (0.12 mole) in 70:30 benzene:ether and then 100 ml of anhydrous tetrahydrofuran. The flask was immersed in an ice bath and cooled to an internal temperature of 5°C and a solution of 30.8(0.1 mole) $\beta$-phenyl-$\beta$-(4-methyl-1-piperazinyl)-propiophenone in 200 ml anhydrous tetrahydrofuran was added dropwise in ca. 2.5 hours, and the resulting adduct treated with 150 ml of saturated ammonium chloride solution. The organic phase was washed once with 100 ml of brine and twice with 200 ml 2N HCl. The aqueous acid was extracted once with 100 ml of methylene chloride, cooled and made basic (pH>10) by the addition of solid potassium hydroxide and extracted twice with 250 ml of ether. The ether was washed twice with 100 ml of brine, dried over anhydrous magnesium sulfate and evaporated in vacuo to give an amorphous solid which was dissolved in 200 ml cold ethanol through which a stream of anhydrous HCl gas was bubbled to give 4-methyl-α,α,γ-triphenyl-1piperazine propanol dihydrochloride, m.p. 228°–229°C.

EXAMPLE II

By using the conditions of Example 1, step 1 and in place of N-methylpiperazine, and starting with:
1. diallylamine
2. dimethylamine
3. allylmethylamine
4. thiomorpholine
5. morpholine
6. azocine
7. 1-H-azepine
8. piperidine or
9. pyrrolidine, The following intermediate products are obtained:
1. β-diallylamino-β-phenyl-propiophenone
2. β-dimethylamino-β-phenyl-propiophenone
3. β-allylmethylamino-β-phenylpropiophenone
4. β-phenyl-β-(4-thiomorpholinyl) propiophenone
5. β-phenyl-β-(4-morpholinyl) propiophenone
6. octahydro-β-phenyl-β-(1-axocinyl)propiophenone
7. hexahydro-β-phenyl-β-(1H-1-azepinyl)propiophenone
8. β-phenyl-β-(1-piperidinyl)propiophenone or
9. β-phenyl-β-(1-pyrrolidinyl)propiophenone.

EXAMPLE III

By using the conditions of Example 1, step 1 and in place of β-phenyl-acrylophenone, and starting with:
1. β-(3-methoxyphenyl)-acrylophenone
2. β-(3-tolyl)-acrylophenone
3. β-(3-α,α,α-trifluoro-tolyl)-acrylophenone
4. β-(3,4-methylenedioxyphenyl)-acrylophenone
5. β-(3-chlorophenyl)-acrylophenone
6. β-(3-fluorophenyl)-acrylophenone
7. β-(4-tolyl)-acrylophenone
8. β-(4-chlorophenyl)-acrylophenone
9. β-(4-α,α,α-trifluorotolyl)-acrylophenone
10. β-(4-fluorophenyl)-acrylophenone
11. β-phenyl-4-methoxyacrylophenone
12. β-phenyl-4-methylacrylophenone
13. β-phenyl-4-trifluoromethylacrylophenone
14. β-phenyl-3,4-methylendioxyacrylophenone
15. β-phenyl-4-chloroacrylophenone or
16. β-phenyl-4-fluoroacrylophenone, The following intermediate products are obtained:
1. β-(3-methoxyphenyl)-β-(4-methyl-1-piperazinyl)propiophenone
2. β-(3-tolyl)-β-(4-methyl-1-piperazinyl)propiophenone
3. β-(α,α,α-trifluorotolyl)-β-(4-methyl-1-piperazinyl)propiophenone
4. β-(3,4-methylenedioxyphenyl)-β-(4-methyl-1-piperazinyl)propiophenone
5. β-(3-chlorophenyl)-β-(4-methyl-1-piperazinyl)propiophenone
6. β-(3-fluorophenyl)-β-(4-methyl-1-piperazinyl)propiophenone
7. β-(4-tolyl)-β-(4-methyl-1-piperazinyl)propiophenone
8. β-(4-chlorophenyl)-β-(4-methyl-1-piperazinyl)propiophenone
9. β-(4-α,α,α-trifluorotolyl)-β-(4-methyl-1-piperazinyl)propiophenone
10. β-(4-fluorophenyl)-β-(4-methyl-1-piperazinyl)propiophenone
11. β-phenyl-β-(4-methyl-1-piperazinyl)-4-methoxypropiophenone
12. β-phenyl-β-(4-methyl-1-piperazinyl)-4-piperazinyl)-4-methylpropiophenone
13. β-phenyl-β-(4-methyl-1-piperazinyl)-4-trifluoromethyl-propiophenone
14. β-phenyl-β-(4-methyl-1-piperazinyl)-3,4-methylendioxy-propiophenone
15. β-phenyl-β-(4-methyl-1-piperazinyl)-4-chloropropiophenone or
16. β-phenyl-β-(4-methyl-1-piperazinyl)-4-fluoropropiophenone.

EXAMPLE IV

By using the condition of Example 1, step 2, and in place of β-phenyl-β-(4-methyl-1-piperazinyl)propiophenone, and starting with:
1. β-diallylamino-β-phenylpropiophenone
2. β-dimethylamino-β-phenylpropiophenone
3. β-allylmethylamino-β-phenylpropiophenone
4. β-phenyl-β-(4-thiomorpholinyl)propiophenone
5. β-phenyl-β-(4-morpholinyl)propiophenone
6. octahydro-β-phenyl-β-(1-azocinyl)propiophenone
7. hexahydro-β-phenyl-β-(1H-1-azepinyl)propiophenone
8. β-phenyl-β-(1-piperidyl)propiophenone
9. β-phenyl-β-(1-pyrrolidinyl)propiophenone
10. β-(3-methoxyphenyl)-β-(4-methyl-1-piperazinyl)propiophenone
11. β-(3-tolyl)-β-(4-methyl-1-piperazinyl)propiophenone
12. β-(3-α,α,α-trifluorotolyl)-β-(4-methyl-1-piperazinyl)propiophenone
13. β-(3,4-methylenedioxyphenyl)-β-(4-methyl-1-piperazinyl)propiophenone
14. β-(3-chlorophenyl)-β-(4-methyl-1-piperazinyl)propiophenone
15. β-(3-fluorophenyl)-β-(4-methyl-1-piperazinyl)-propiophenone
16. β-(4-tolyl)-β-(4-methyl-1-piperazinyl)propiophenone
17. β-(4-chlorophenyl)-β-(4-methyl-1-piperazinyl)propiophenone
18. β-(4-α,α,α-trifluorotolyl)-β-(4-methyl-1-piperazinyl)propiophenone or
19. β-(4-fluorophenyl)-β-(4-methyl-1-piperazinyl)propiophenone, The following products are obtained as the dihydrochloride salt:
1. γ-diallylamino-α,α,γ-triphenylpropanol
2. γ-dimethylamino-α,α,γ-triphenylpropanol
3. γ-allylmethylamino-α,α,γ-triphenylpropanol
4. α,α,γ-triphenyl-4-thiomorpholinepropanol
5. α,α,γ-triphenyl-4-morpholinepropanol
6. octahydro-α,α,γ-triphenyl-1-azocinepropanol
7. hexahydro-α,α,γ-triphenyl-1H-1-azepinepropanol
8. α,α,γ-triphenyl-1-piperidinepropanol 9. α,α,γ-triphenyl-1-pyrrolidinepropanol
10. 4-methyl-α,α,-diphenyl-γ-(3-methoxyphenyl)-1-piperazinepropanol
11. 4-methyl-α,α-diphenyl-γ-(3-tolyl)-1-piperazinepropanol
12. 4-methyl-α,α-diphenyl-γ-(3-α,α,α-trifluorotolyl)-1-piperazinepropanol
13. 4-methyl-α,α-diphenyl-γ-(3,4-methylenedioxy)-1-piperazinepropanol
14. 4-methyl-α,α-diphenyl-γ-(3-chlorophenyl)-1-piperazinepropanol
15. 4-methyl-α,α-diphenyl-γ-(3-fluorophenyl)-1-piperazinepropanol
16. 4-methyl-α,α,-diphenyl-γ-(4-tolyl)-1-piperazinepropanol
17. 4-methyl-α,α-diphenyl-γ-(4-chlorophenyl)-1-piperazinepropanol
18. 4-methyl-α,α-diphenyl-γ-(4-α,α,α-trifluoromethyl)-1-piperazinepropanol or
19. 4-methyl-α,α-diphenyl-γ-(4-fluorophenyl)-1-piperazinepropanol.

EXAMPLE V

By using the conditions of Example 1, step 2 and in place of phenyllithium, and starting with:
1. 4-methoxyphenyllithium
2. 4-tolyllithium
3. 4-α,α,α-trifluorotolyllithium
4. 3,4-methylenedioxy-phenyllithium
5. 4-chlorophenyllithium
6. 4-fluoro-phenyllithium, The following products are obtained as the dihydrochloride salt:
1. 4-methyl-α,γ-diphenyl-α-(4-methoxyphenyl)-1piperazinepropanol
2. 4-methyl-α,γ-diphenyl-α-(4-tolyl)-1-piperazinepropanol
3. 4-methyl-α,γ-diphenyl-α-(4-α,α,α-trifluoromethyl)-1-piperazinepropanol
4. 4-methyl-α,γ-diphenyl-α-(3,4-methylenedioxyphenyl)-1-piperazinepropanol
5. 4-methyl-α,γ-diphenyl-α-(4-chlorophenyl)-1-piperazinepropanol or
6. 4-methyl-α,γ-diphenyl-α-(4-fluorophenyl)-1-piperazinepropanol.

EXAMPLE VI

By using the conditions of Example 1 step 2 and in place of β-phenyl-β-(4-methyl-1-piperazinyl)propiophenone and phenyllithium respectively and starting with:
1. β-phenyl-β-(4-methyl-1-piperazinyl)-4-methoxypropiophenone and 4-methoxyphenyllithium
2. β-phenyl-β-(4-methyl-1-piperazinyl)-4-methylpropiophenone and 4-tolyllithium
3. β-phenyl-(4-methyl-1-piperazinyl)-4-trifluoromethylpropiophenone and 4-α,α,α-trifluorotolyllithium
4. β-phenyl-β-(4-methyl-1-piperazinyl)-3,4-methylenedioxypropiophenone and 3,4-methylenedioxy-phenyllithium
5. β-phenyl-(4-methyl-1-piperazinyl)-4-chloropropiophenone and 4-chloro-phenyllithium
or
6. β-phenyl-β(4-methyl-1-piperazinyl)4-fluoropropiophenone and 4-fluorophenyllithium, The following products are obtained as the dihydrochloride salt:
1. 4-methyl-α,α-bis-(4-methoxyphenyl)-γ-phenyl-1-piperazinepropanol
2. 4-methyl-α,α-bis-(4-tolyl)-γ-phenyl-1-piperazinepropanol
3. 4-methyl-α,α-bis (4-α,α,α-trifluorotolyl)-γ-phenyl-1-piperazinepropanol
4. 4-methyl-α,α-bis-(3,4-methylenedioxyphenyl)-γ-phenyl-1-piperazinepropanol
5. 4-methyl-α,α-bis-(4-chlorophenyl)-γ-phenyl-1-piperazinepropanol or
6. 4-methyl-α,α-bis-(4-fluorophenyl)-γ-phenyl-1-piperazinepropanol.

What is claimed is:
1. A compound of the formula:

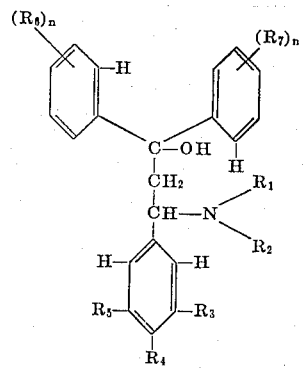

wherein $R_1$ and $R_2$ together are

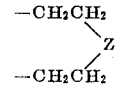

where Z is $N-R_8$, where $R_8$ is lower alkyl having 1 to 4 carbon atoms, $R_3$, $R_4$, $R_6$ and $R_7$ are, independently, hydrogen, halo having an atomic weight of 19 to 36, trifluoromethyl, lower alkyl having 1 to 4 carbon atoms, or lower alkoxy having 1 to 4 carbon atoms, $R_4$ is hydrogen, halo having an atomic weight of 19 to 36, trifluoromethyl or lower alkyl having 1 to 4 carbon atoms or $R_3$ and $R_4$ together or $R_4$ and $R_5$ together are methylenedioxy or when n = 2, $R_6$ and/or $R_7$ is methylenedioxy, and n is 0, 1 or 2.

or a pharmaceutically acceptable acid addition salt thereof.

provided that
1. no more than one of $R_6$ and/or $R_7$ may be trifluoromethyl,
2. there are no adjacent trifluoromethyl groups and
3. there are no adjacent tertiary butyl groups.

2. The compound of claim 1 which is 4-methyl-α,α,γ-triphenyl-1-piperazine propanol dihydrochloride.

* * * * *